INVENTORS
FRANK DAY, MAGNUS L. FROBERG
& JERRY B. HOLSCHLAG
BY
ATTORNEYS

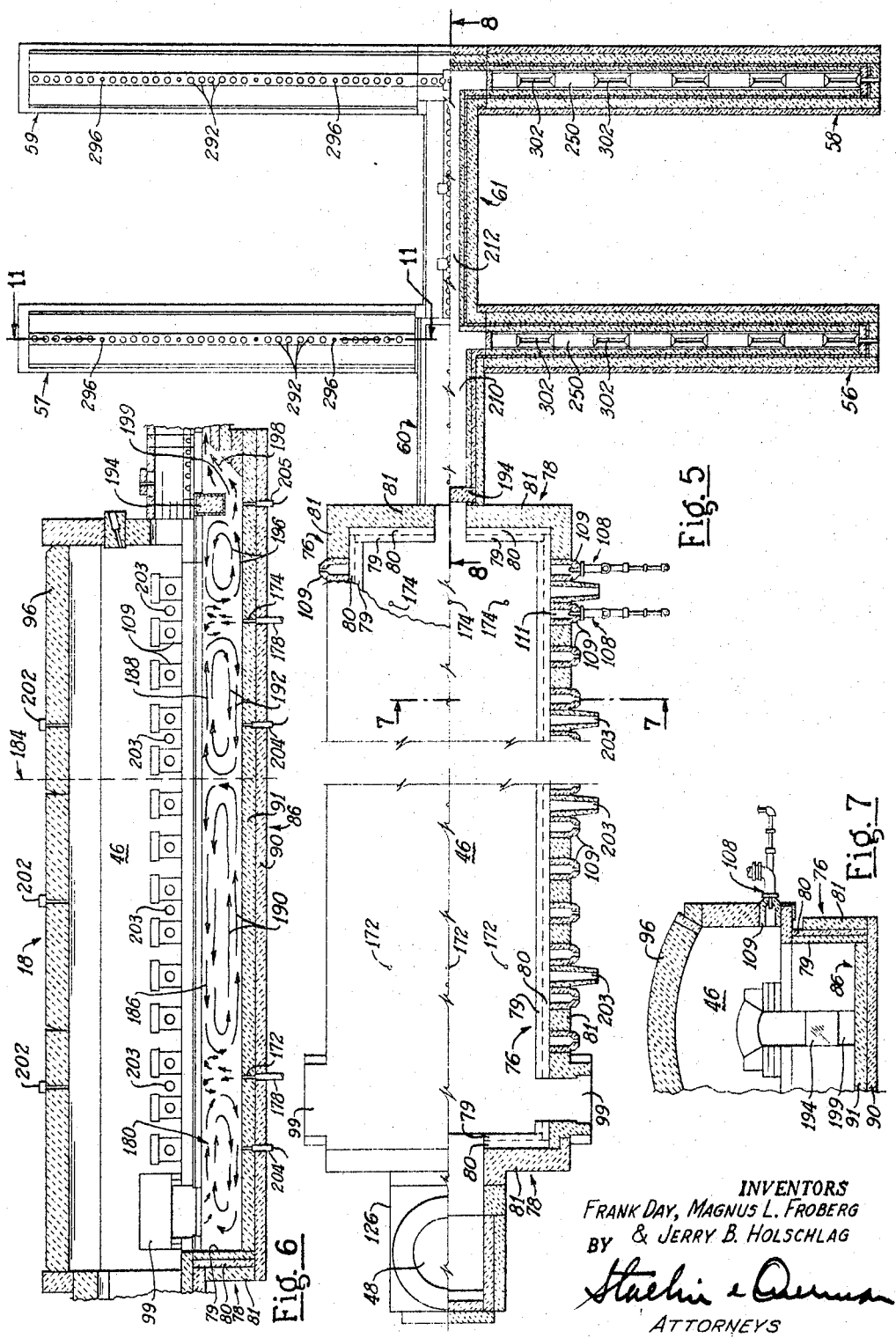

Aug. 30, 1966     F. DAY ETAL     3,269,820
METHOD, SYSTEM AND APPARATUS FOR PROCESSING FILAMENT-FORMING
MINERAL MATERIALS
Original Filed May 29, 1961     10 Sheets-Sheet 6
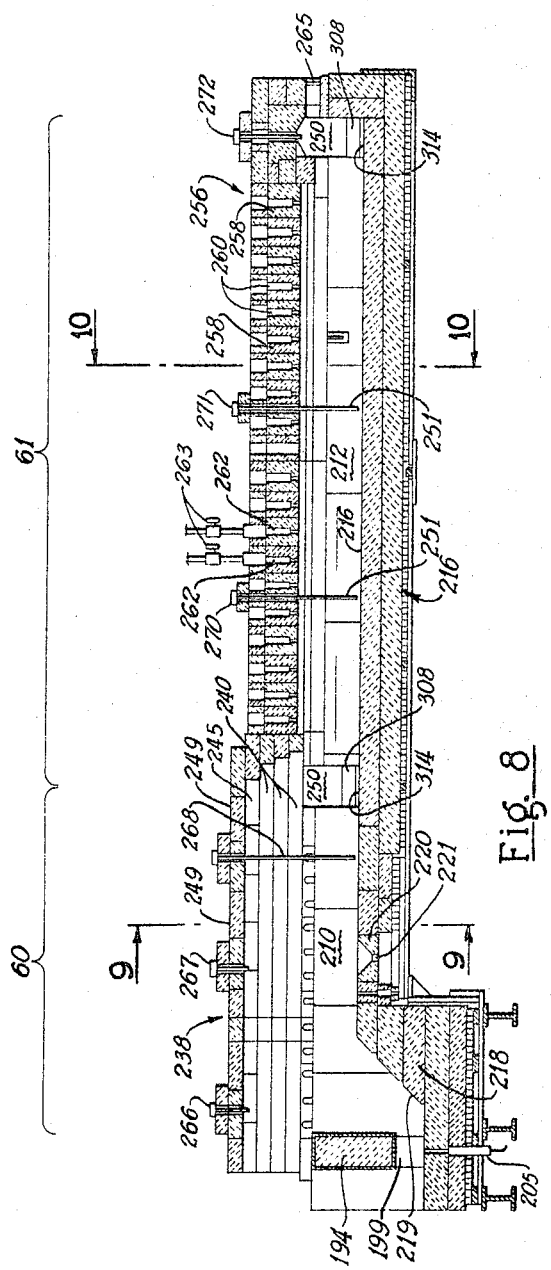
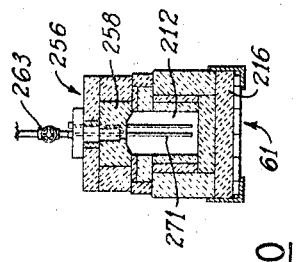
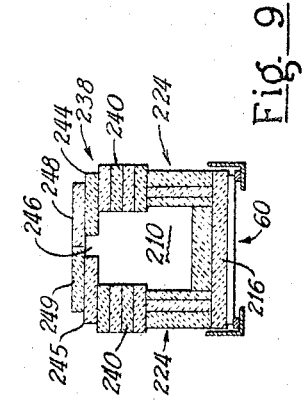
INVENTORS
FRANK DAY, MAGNUS L. FROBERG
BY   & JERRY B. HOLSCHLAG
ATTORNEYS

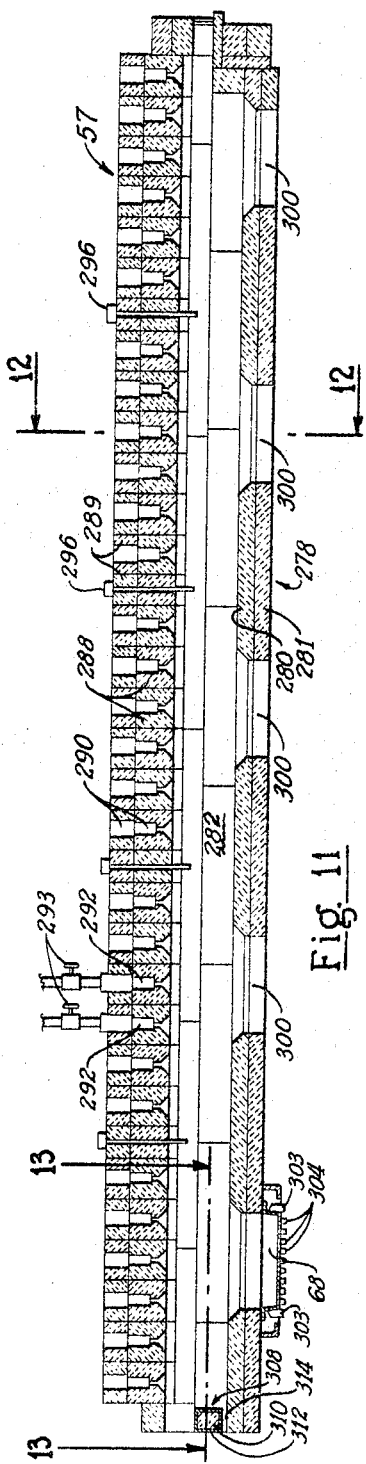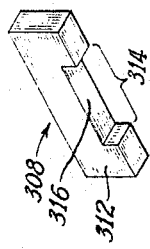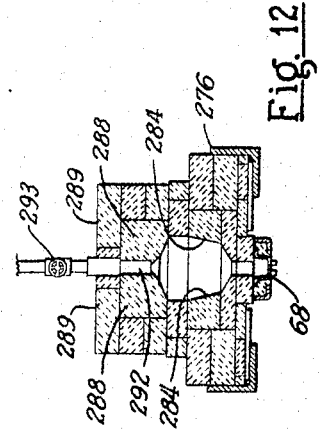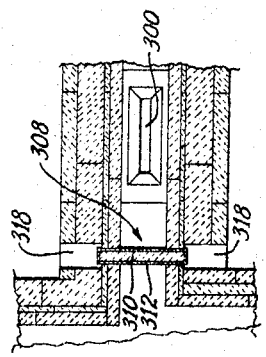

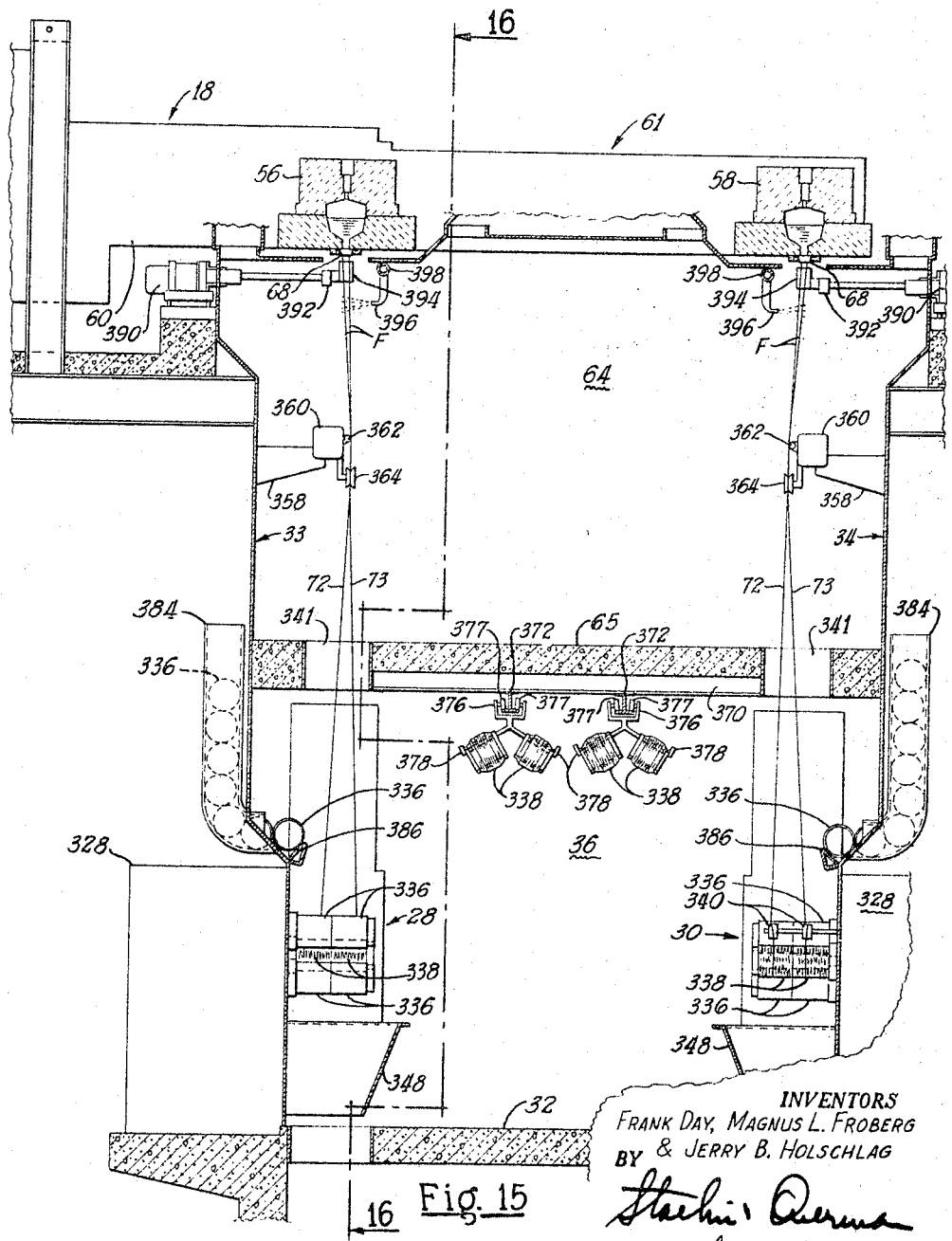

INVENTORS
FRANK DAY, MAGNUS L. FROBERG,
& JERRY B. HOLSCHLAG
ATTORNEYS

Aug. 30, 1966 F. DAY ETAL 3,269,820
METHOD, SYSTEM AND APPARATUS FOR PROCESSING FILAMENT-FORMING
MINERAL MATERIALS
Original Filed May 29, 1961 10 Sheets-Sheet 10

INVENTORS
FRANK DAY, MAGNUS L. FROBERG,
BY & JERRY B. HOLSCHLAG

ATTORNEYS

United States Patent Office 3,269,820
Patented August 30, 1966

3,269,820
METHOD, SYSTEM AND APPARATUS FOR PROCESSING FILAMENT-FORMING MINERAL MATERIALS
Frank Day, Granville, and Magnus L. Froberg, Newark, Ohio, and Jerry B. Holschlag, Greenwood, S.C., assignors to Owens-Corning Fiberglas Corporation, a corporation of Delaware
Continuation of application Ser. No. 113,526, May 29, 1961. This application June 14, 1965, Ser. No. 463,541
4 Claims. (Cl. 65—136)

This application is a continuation of our copending application, Serial No. 113,526, filed May 29, 1961, now abandoned.

This invention relates to method, system and apparatus for processing heat-softenable mineral materials such as glass and more especially to a method, system and apparatus for carrying on continuous processing of mineral material from a batch stage through melting and fining stages, delivering fine streams of the material, attenuating the streams to fine filaments and packaging the fine filaments automatically.

Fine textile filaments have been produced by attenuating streams of glass from a feeder to fine filaments by winding the filaments upon a collector or tube in package form.

In such methods heretofore employed, pre-refined glass in the form of glass marbles or spheres are re-melted or re-softened in a heated feeder or bushing and streams of glass discharged through orifices in the feeder are attenuated to filaments by winding a strand of the filaments on a tube. Such process renders the cost of textile filaments high because of the low pull rate of glass from the feeder in addition to the necessity for re-heating the glass in marble form.

Attempts have been made to melt glass batch in a compartively small tank or receptacle and supply the molten glass to one or more feeders from which streams of glass are attenuated by winding the filaments upon collectors or tubes. Difficulties have been experienced in producing a refined glass suitable for textile filaments by this direct melting process because of deficiencies in refining the glass due to the restricted size of the melting furnace or receptacle, lack of proper travel of the glass and ineffective time-temperature balance whereby the glass is insufficiently refined for satisfactorily forming textile filaments at a low cost on a commercial scale. Furthermore, in such methods it has been a practice to wind a strand of filaments from a feeder upon a single tube and when the tube is filled to package size, the tube is brought to rest, the package removed, an empty sleeve placed in winding position and filament attenuation resumed.

During this transition period, the flow of streams from the feeder is interrupted disturbing the flow-balance of the feeder, and upon the initial start-up of the empty sleeve, substantial lengths of attenuated filaments are of improper size and the filaments attenuated during the period of bringing the empty sleeve from a static to a winding speed results in substantial waste of material. Such interruption in the flow rate from the feeder adversely affects the operating conditions and temperature of the glass in the feeder rendering it difficult to maintain efficient attenuating conditions due to the interruptions in winding operations.

More recent developments have been made in means for continuously attenuating streams to filaments in a manner to minimize or reduce the quantity of filaments of improper size by maintaining continuity of filament movement during the period that a completed package is brought to rest and removed from the winding area and an empty collector moved into winding position upon the completion of each strand package.

The present invention substantially eliminates the difficulties encountered in prior processes of forming and packaging continuous textile filaments and embraces a series of steps or operations which are carried on automatically whereby the production of fine textile filaments per unit of heat energy expended is increased, the production of textile filaments attained on a greatly expanded commercial scale, and substantial savings effected in the cost of producing textile filaments of uniform size and high quality.

The invention embraces a method or system wherein a series of glass melting and processing facilities or units are employed, each unit provided with a plurality of forehearth sections oriented or arranged in aligned rows and the forehearth sections provided with large numbers of orificed feeders in combination with automatic filament-attenuating and packaging units individual to each feeder or plurality of feeders arranged in an enclosure or chamber wherein the automatic packaging units or devices are disposed in rows along each side of an aisle to facilitate supervision of the operations by a minimum number of operators.

An object of the invention embraces a melting and conditioning facility or unit for processing raw batch filament-forming material and refining and conditioning the same suitable for forming textile filaments wherein a plurality of forehearths or forehearth sections are supplied with the refined material from the unit, the unit being of a size and character to promote a repeated circulation or recycling of the molten material in paths by agitation and convection whereby the material is fined and refined during its circulatory movements in the melting and conditioning unit so that the material is maintained in the unit for a comparatively long period of time to assure substantially complete degasification of the material and the promotion of homogeneity thereof.

Another object of the invention resides in the provision of a combined melting, fining and refining furnace or chamber for heat-softenable mineral material such as glass having a comparatively high length-to-width ratio wherein effective circulation of the glass or other mineral material is attained and an improved heat balance provided in the melting and refining chamber without the use of transverse barriers or weirs and with minimum of liability of contamination by deterioration of the refractory lining of the furnace or chamber.

Another object of the invention resides in the provision of a melting and refining receptacle or chamber provided with a single exhaust stack in conjunction with multiple batch feeders and a recuperator associated with the stack providing preheated air delivered to the combustion burners employed for heating the receptacle whereby heat losses are reduced to a minimum.

Another object of the invention is the provision of a melting and fining refractory lined chamber wherein the mineral material is exposed to a less area of refractory as compared with conventional melting chambers or furnaces.

Another object of the invention is the provision of temperature gradient control in a melting and refining furnace avoiding the establishment of chilled areas which would impair the circulatory flow of the material in the furnace.

Another object of the invention is the provision of a melting and fining facility for heat-softenable mineral materials such as glass wherein temperature surge is reduced to a minimum providing a time-temperature balance or dynamic constancy and avoiding uncontrolled variations in temperature whereby to provide continuous melting and refining with a minimum variation of factors which would adversely affect the circuitous flow paths of the glass in the refining zone assuring the delivery of highly refined glass for further processng.

Another object of the invention is the establishment of zones of differential temperature within the melting and fining furnace or chamber to establish and maintain convection flow paths of the mineral material of a character to prevent or minimize major temperature changes or variations in isolated regions of the material within the chamber.

Another object of the invention is the establishment of substantial differentials in temperature in certain zones of the flowable glass or other material in the melting and fining chamber in order to promote or accelerate a high rate of convection flow to obtain improved time-temperature stabilization and the exercise of effective control of the convection flow in order to offset minor temperature variations throughout the melt and thereby render less critical any minor variations in temperature in the melt.

A further object of the invention is the provision of a melting and fining furnace or chamber for glass or other heat-softenable material wherein controlled temperature differentials are set up to effect by convection a controlled circulation or flow pattern of the glass or other material in the chamber whereby the glass or material, under the influence of convection flow, is forced to remain for a substantial period of time within the chamber and is required to traverse substantial distances before its discharge through a flow channel in order to promote a high degree of homogeneity in the glass rendering it suitable for the formation of textile filaments.

Another object of the invention is the provision of a plurality of melting and fining furnaces or units wherein each unit is provided with a plurality of forehearths or forehearth sections each provided with a plurality of stream feeders or bushings arranged to discharge fine streams of glass wherein the feeders are aligned in continuous rectilinear rows and the groups of streams are processed to strands of filaments by automatic winding machines disposed in rows beneath the feeders facilitating continuous operation with a minimum number of operators.

Another object of the invention is the provision of melting and refining units particularly adaptable for conditioning glass or other mineral material for forming textile filaments wherein the amount of glass processed per unit of time is greatly increased and advantage taken of high melting rates and volume production of filaments to reduce the cost of textile filaments.

Another object of the invention resides in the provision of a plurality of melting and refining units wherein the chamber of each unit is provided with a single exhaust stack equipped with a recuperator of a character for preheating the air employed as the oxidation for the combustion burners for heating the chamber and control means provided for each burner for operation near maximum luminosity and for establishing and maintaining differential temperatures in various regions of the chamber for controlling melting and convection flow of the material with minimum heat losses.

Another object of the invention resides in a system involving a plurality of melting and refining units each equipped with a plurality of forehearths or forehearth sections arranged in at least two rows with the forehearths of adjacent units arranged in end-to-end relation with the rows disposed lengthwise of a chamber and the rows spaced to facilitate the positioning of rows of automatic winding machines beneath the forehearths in an elongated closure.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 5 is a top plan view of one of the melting and refining furnace and forehearth constructions with certain portions illustrated in section;

FIGURE 6 is a longitudinal sectional view of the furnace or melting and refining tank shown in FIGURE 5, illustrating schematically the convection flow paths of the molten glass;

FIGURE 7 is a transverse sectional view taken substantially on the line 7—7 of FIGURE 5;

FIGURE 8 is a longitudinal sectional view through a glass flow channel construction of the forehearth arrangement, the section being taken substantially on the line 8—8 of FIGURE 5;

FIGURE 9 is a transverse sectional view taken substantially on the line 9—9 of FIGURE 8;

FIGURE 10 is a transverse sectional view taken substantially on the line 10—10 of FIGURE 8;

FIGURE 11 is a longitudinal sectional view through one of the forehearth sections or branches, the view being taken substantially on the line 11—11 of FIGURE 5;

FIGURE 12 is a transverse sectional view through a forehearth section, the view being taken substantially on the line 12—12 of FIGURE 11;

FIGURE 13 is a fragmentary detailed sectional view taken substantially on the line 13—13 of FIGURE 11;

FIGURE 14 is an isometric view of a heat sink component associated with each forehearth section or branch;

FIGURE 15 is a sectional view illustrating one of the forehearth arrangements, forming room and automatic strand winding units disposed beneath dual forehearth sections or branches;

The system, method and apparatus of the invention are particularly adaptable for use in melting, conditioning and distributing glass for forming streams of the glass to continuous fine filaments by employment of automatic filament attenuating and filament packaging apparatus but it is to be understood that the system, method and apparatus may be employed in the processing of other heat-softenable materials and forming and packaging filaments of the materials.

The apparatus of the invention embraces a novel melting and conditioning furnace or chamber wherein raw glass batch suitable for forming fine textile filaments is reduced to a molten state, fined and refined in the same chamber and distributed through a plurality of forehearths or forehearth sections direct to stream feeders and the streams of glass flowing therefrom continuously attenuated to fine filaments, and strands of the filaments collected in packages by automatic winding units so that there is no interruption of the stream feeding and filament attenuation steps.

The invention embraces a system of orienting a plurality of glass melting, conditioning and distributing units whereby dual rows of aligned forehearths or forehearth sections are provided and the filaments delivered into a room or enclosure enabling the supervision of the automatic winding or multifilament strand packaging machines by a minimum number of operators and facilitating the disposition of completed packages of strand and application of empty strand collectors to the winding and packaging machines.

Figure 1:
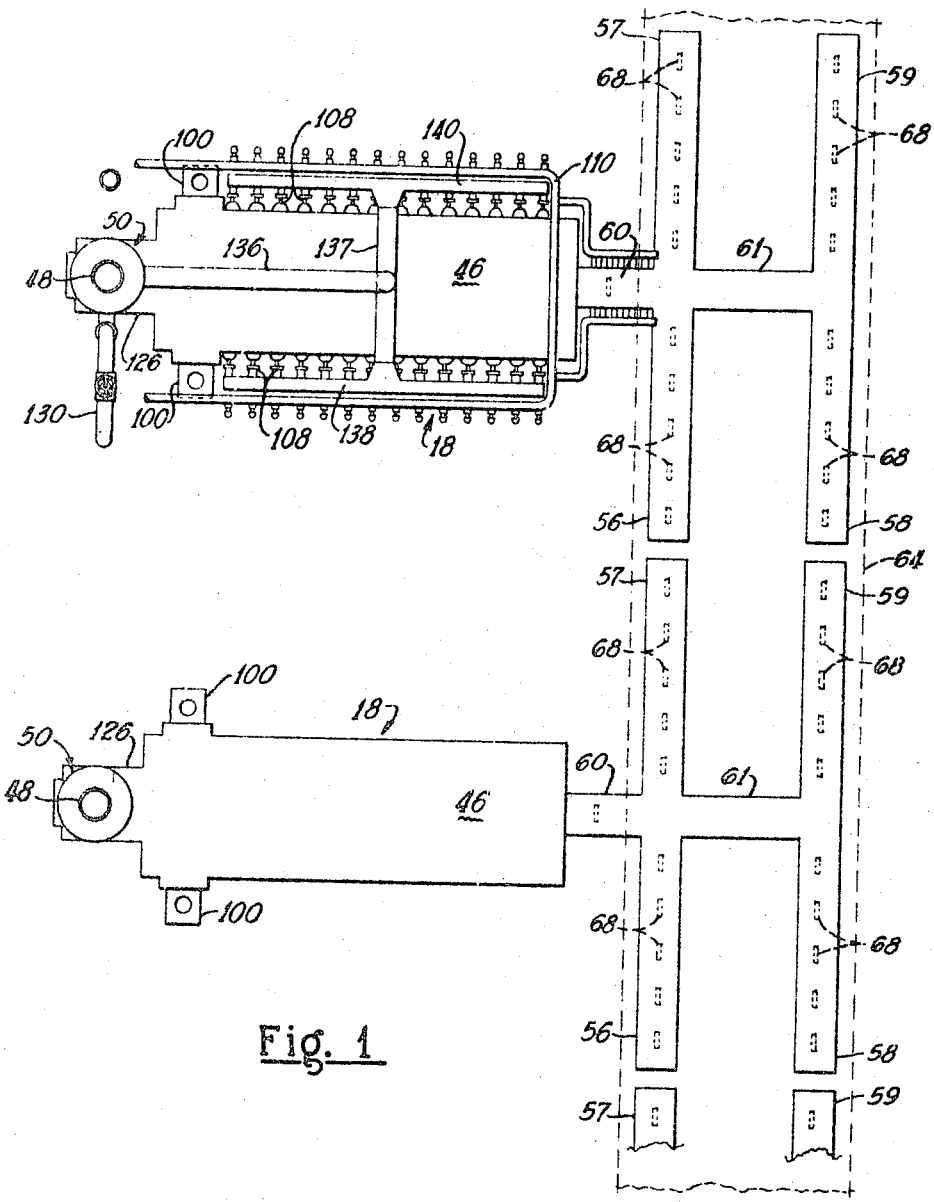
FIGURE 1 is a semischematic top plan view showing a plurality of melting and refining units or furnaces and associated forehearths illustrating the aligned relation of rows of forehearths and stream feeders associated therewith.
Figure 2:
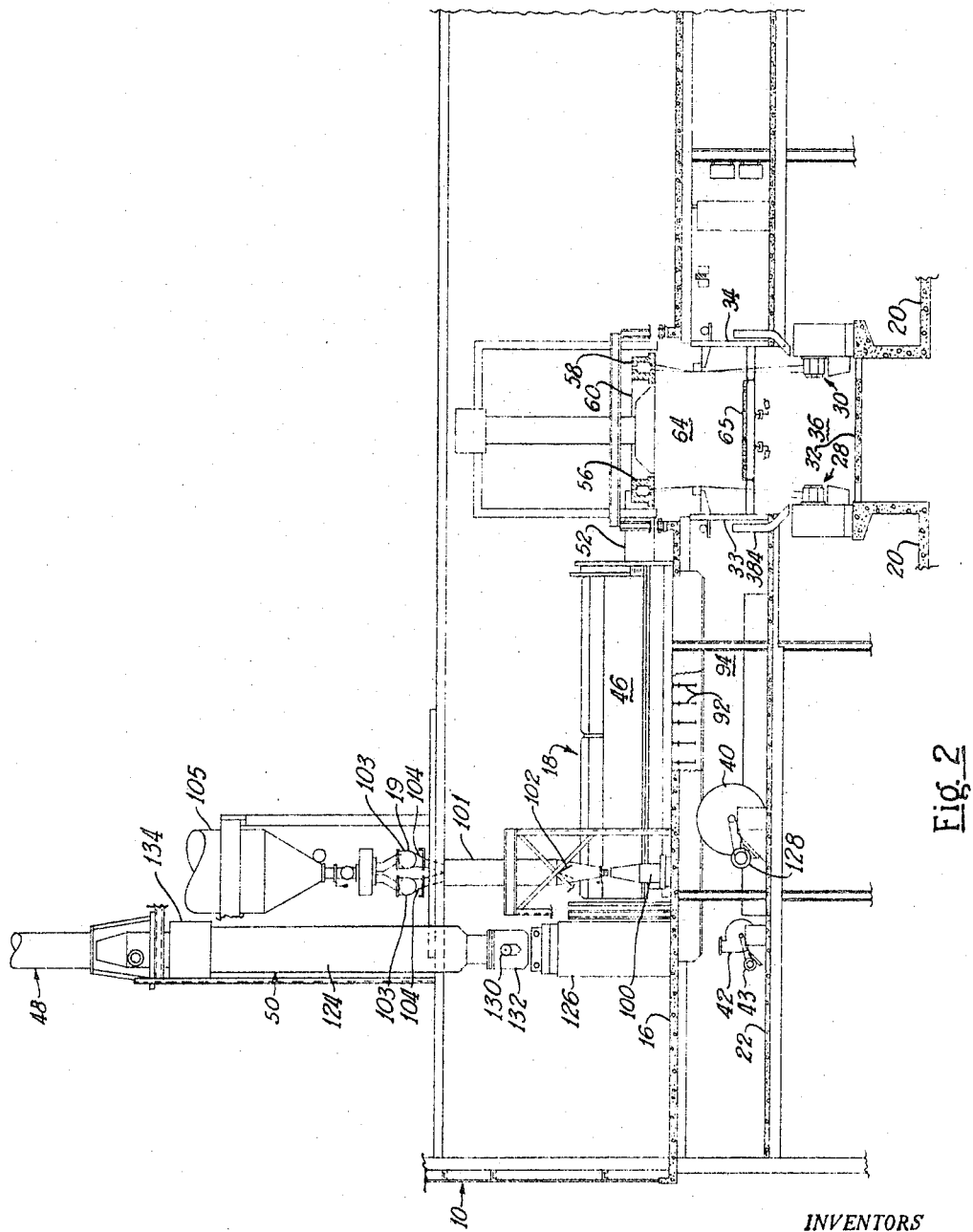
FIGURE 2 is an elevational view of an installation or arrangement of melting and refining furnace and forehearth construction and associated components for processing raw batch mineral material to packaged filaments.

Referring initially to FIGURE 2 of the drawings, the apparatus is disposed in a building or walled enclosure 10 provided with an upper level or floor 16, the melting and refining furnaces or tanks 18 of the units being disposed on this level and being arranged in generally parallel relation, the lengthwise position of the tanks 18 being preferably transversely of the building 10. FIGURE 1 illustrates in plan view two of such units 18 disposed in parallel relation, but any number of units may be arranged in the relative positions as indicated in FIGURE 1.

It is found that five or more units 18 arranged in such relative positions may be employed to advantage in attaining high yield of continuous filaments with a minimum number of operators and supervision. Several batteries or rows, each comprising a plurality of units 18 may be employed in adjacent relation as they may be readily supplied with glass batch from a conveyor system 19 and with a minimum of piping for the fuel gas and combustion air for the combustion burners employed for heating the glass or other material in the tanks 18.

The building 10 is provided with a lower floor or level 20 and an intermediate floor or level 22. There are two rows or batteries of winding machines designated 28 and 30 as shown in FIGURE 2, the winding machines being mounted upon a floor 32 which is above the level of floor 20. The floor 32 in conjunction with spaced parallel vertical walls 33 and 34 defines an elongated room, chamber or enclosure 36 in which the operators are stationed to supervise the operation of the automatic winding machines.

The intermediate floor 22 supports a series of motor driven blowers 40 and 42 (two of which are shown in FIGURE 2) one being employed for supplying air under pressure to a recuperator for delivery to the combustion burners of the melting tanks and the other supplying air as a damper for controlling pressure within the melting and refining chamber. The melting and refining chamber or tank 46 of each unit 18 is provided with a single exhaust stack 48 disposed adjacent the rear end of each tank, each stack being in communication with the adjacent tank at a region above the glass level in the tank. The stack construction is equipped with a recuperator 50 for preheating air for mixing with the fuel gas of the combustion burners.

Figure 17:
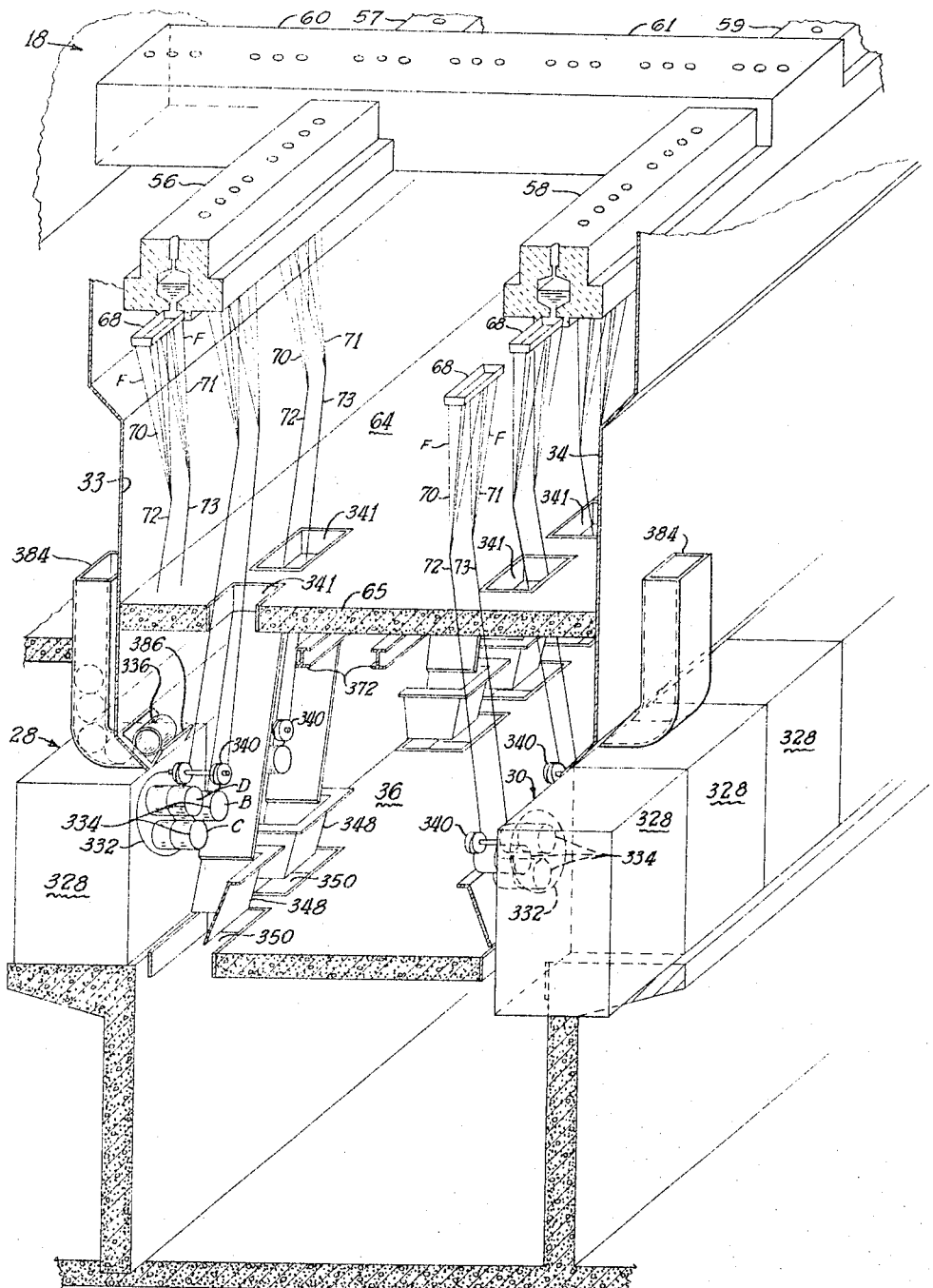
FIGURE 17 is an isometric schematic view showing the orientation or relation of the multiple forehearths and the batteries of automatic winding machines.

An important feature of the invention embraces a particular forehearth construction for each furnace unit 18 comprising a central connecting section and a plurality of forehearth sections or branches associated with each melting tank, the forehearth sections and the central connecting flow channel construction from each tank being oriented into a double T or H-shape configuration of the character shown in FIGURES 1, 5 and 17. Projecting lengthwise and forwardly of each melting and refining tank 46 is a rectilinear forehearth construction which provides a central flow channel to convey molten glass or other mineral material from the melting tank 46 to the forehearth sections or forehearth branches 56, 57, 58 and 59.

There are four forehearth sections for each melting and distributing unit 18 as shown in FIGURE 1. The central connecting forehearth construction comprises two aligned portions or sections 60 and 61 which are respectively provided with connecting flow channels 210 and 212 arranged to convey refined molten glass to the forehearth sections. As illustrated in FIGURE 1, the oppositely extending forehearth sections or branches 56 and 57 of each of the units are arranged in aligned end-to-end relation in a direction normal to the lengthwise axis of each of the melting and refining tanks 46.

The pairs of forehearth sections 58 and 59 are spaced from the forehearth sections 56 and 57 but are arranged in parallelism therewith and the pairs of forehearth sections or branches 58 and 59 are in end-to-end aligned relation as will be apparent from FIGURE 1. With particular reference to FIGURES 1, 2, 16 and 17, it will be seen that the spaced arrangement of pairs of forehearth sections disposed in end-to-end aligned relation facilitates the use of an elongated room or chamber 64 in which streams of glass are flowed from the stream feeders and are attenuated to filaments and converge into strands and binder applied to the strands which are collected and packaged by the rows of winding machines 28 and 30.

Figure 16:
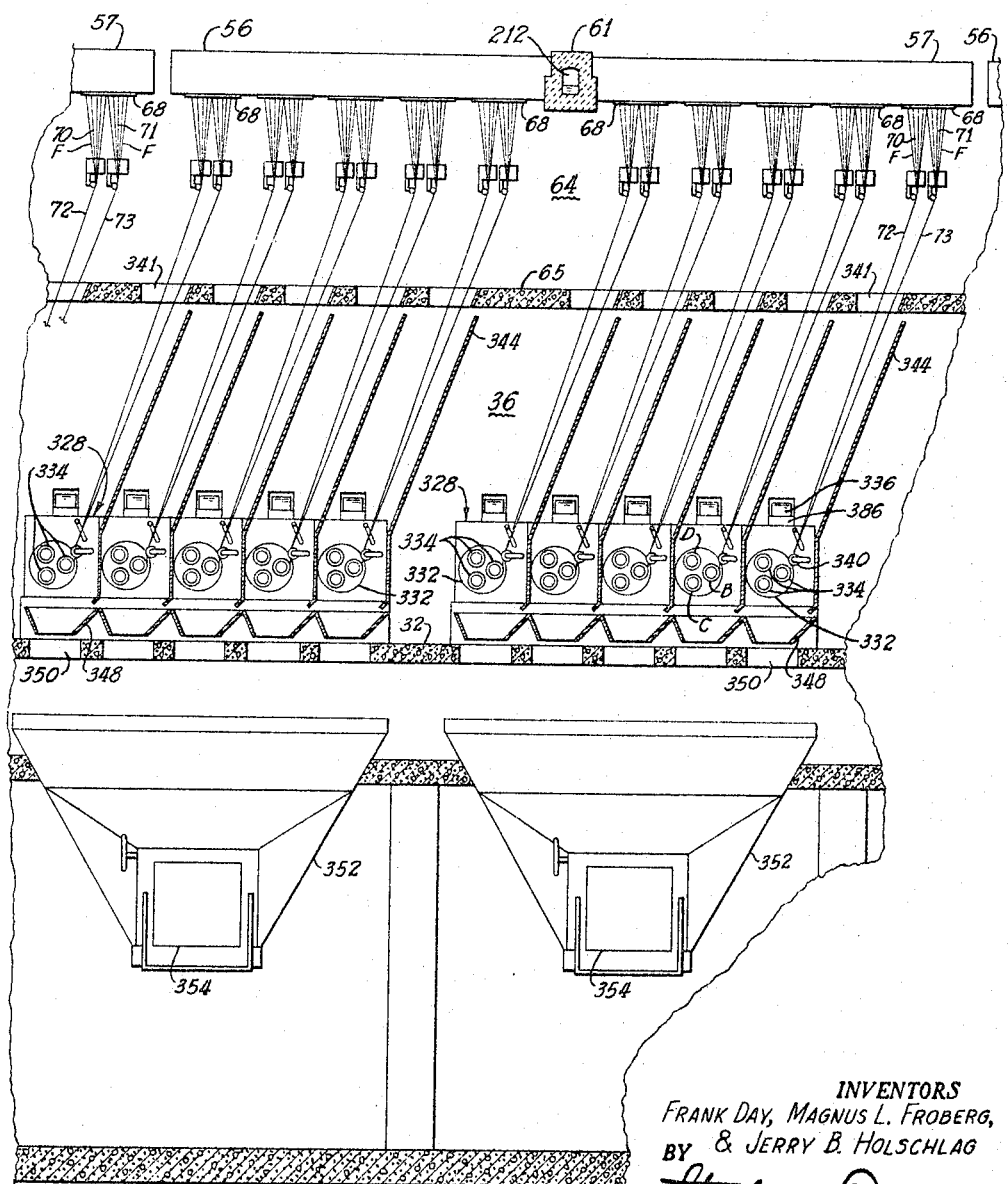
FIGURE 16 is a sectional view taken substantially on the line 16—16 of FIGURE 15.

As shown in FIGURE 16, the winding machines are arranged in two rows with the respective rows adjacent opposite side walls 33 and 34 of an elongated room or chamber 36 providing an uninterrupted aisle extending full length of and between the rows of the winding machines and the forehearth sections of the several glass melting and refining units 18.

Spaced lengthwise along each forehearth section is a plurality of stream feeders 68, the feeders being of identical construction as illustrated in FIGURES 1 and 16. As shown in FIGURE 16, two groups of glass streams 70 and 71 are flowed from orifices in the floor of each feeder 68, each group being attenuated to filaments and the groups of filaments are converged to form dual strands 72 and 73 which are wound upon collectors of the automatic winding machines, the winding machines being operated at comparatively high speeds to attenuate the streams to fine continuous filaments.

The combined melting and refining tank or furnace 46 of each unit is shown in FIGURES 1 through 6. The furnace construction is generally rectangular defined by a floor 86, side walls 76 and end walls 78. It is found that the melting and refining chamber 46 should be of a length of approximately four times its width for efficient melting and refining of the glass. As shown in FIGURE 6, the floor construction 86 is fashioned of blocks of suitable refractory arranged in layers 90 and 91.

Figure 4:
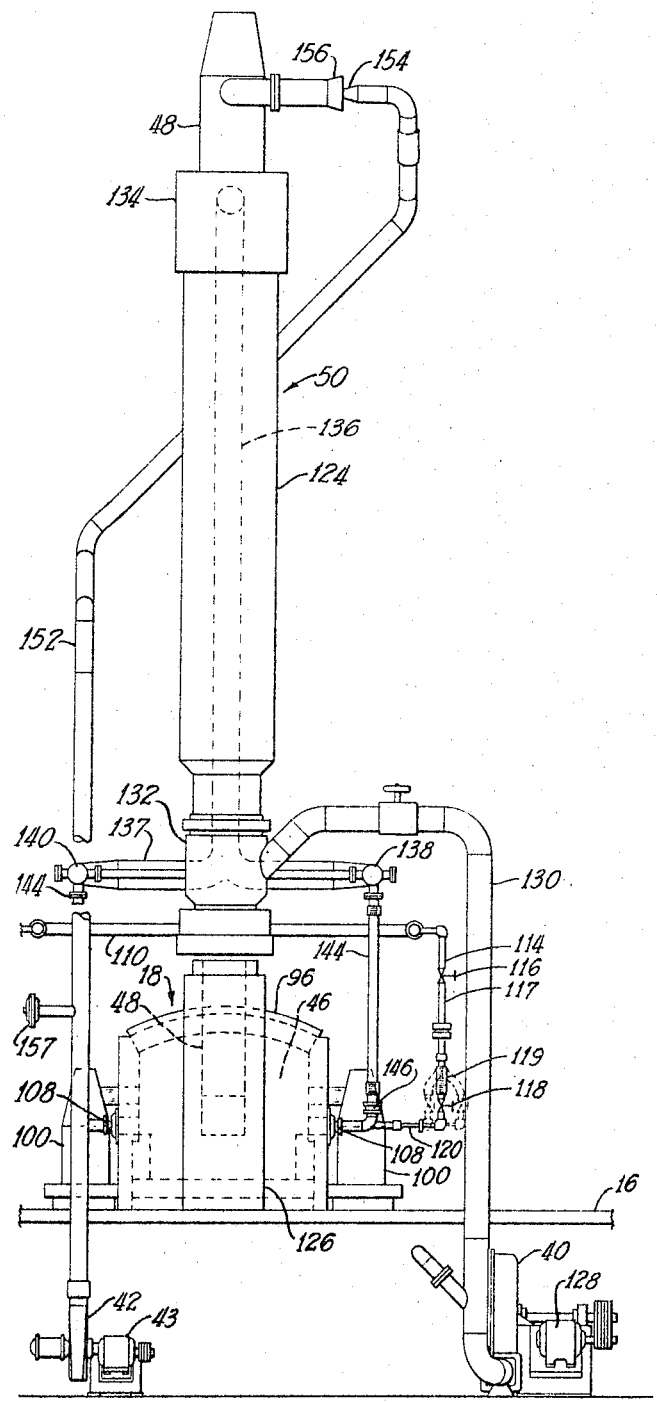
FIGURE 4 is a rear end view of the melting and fining furnace and recuperator construction shown in FIGURE 3.

Each furnace unit 18 is supported upon a suitable frame structure 92 carried by masonry walls 94, shown in FIGURE 2. The furnace floor may be fashioned of suitable refractory and side and end walls are of novel construction and are hereinafter described in detail. The crown 96 of the furnace, shown in FIGURES 4 and 7, is fashioned of suitable refractory.

The arrangement includes means for feeding raw batch glass or other mineral material into the furnace chamber 46 adjacent the rear or stack end and at opposite side regions of the furnace. The batch feeders or chargers 100 are preferably of the motor driven screw feed type of conventional construction. Each batch charger is connected with a batch conveying tube or hopper 101, one of which is shown in FIGURE 2 which extends upwardly and is adapted to be supplied with batch by a screw type conveyor 104 which receives batch from one or more main supply hoppers or storage bins 105 containing the batch material in comminuted form. The batch feeders may be of the reciprocable plunger or "pusher" type if desired.

The conveyor means 104 is adapted to supply glass batch to the several batch chargers or feeders associated with all of the melting and refining units 18. A novel feature of the arrangement resides in concomitantly feeding the raw batch from opposite side regions of the melting furnace. By feeding batch at two opposed regions, improved melting is attained by reason of increased area of glass batch at the charging region subjected to the hot gases of combustion moving toward the exhaust stack 48 of each unit. The electrically energizable motive means (not shown) for actuating the batch chargers for each unit is controlled by means responsive to variations in the amount of glass in the melting and fining chamber for maintaining substantially constant the amount of glass in the chamber.

The chamber 46 of each melting and fining unit is adapted to be fired or heated by fuel gas or other suitable fuel mixed with air which is preheated in the recuperator 50 to a temperature not exceeding that at which the air may be safely mixed with the fuel gas at the regions of delivery of the fuel gas and air into the fuel chamber at lengthwise spaced regions above the level of the glass in the chamber. As shown in FIGURES 1 and 3 through 6, a row or battery of combustion burners 108 mounted in burner blocks 109 is arranged at each side of the furnace.

A gas supply manifold 110, which is connected with a fuel gas supply is equipped with a plurality of tubes 114, a tube being individual to each of the burners 108 for supplying fuel gas thereto. Each pipe 114 is provided with a manually operable cut-off valve 116. Each valve 116 is connected with a pipe 117, each pipe 117 being connected with a fuel control valve 118 by means of a flexible tube or hose 119. Each hose 119 is connected with a horizontally disposed tube 120 extending into a burner 108. The flexible hose facilitates slidable adjustment of each tube 120 to change the relative position of its outlet in the mixing region of the burner 108 to secure maximum luminosity of the flame of combustion to obtain high efficiency of solid particle radiation.

The recuperator or means 50 for preheating the air to be mixed with the fuel in the burners 108 by heat from the gases moving through the stack 48 is inclusive of a jacket 124 surrounding the stack 48, the later supported upon a foundation 126 which also supports the stack 48 at the end of each melting and refining unit 18. A stack and recuperator construction is provided for each of the melting and refining units. The jacket 124 is of cylindrical shape and is spaced circumferentially from the stack 48 to provide an air chamber between the stack and the inner wall surface of the jacket.

Figure 3:
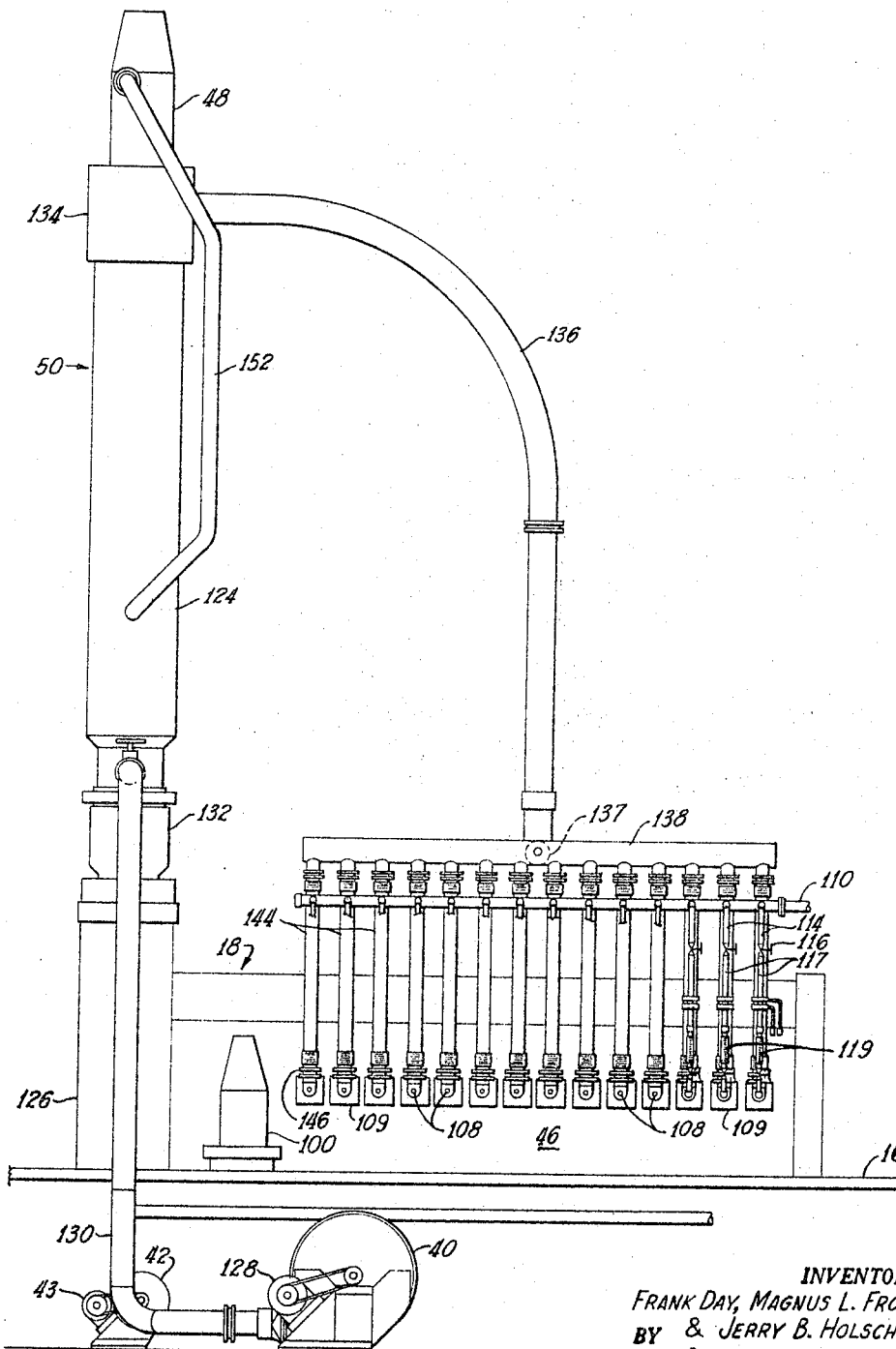
FIGURE 3 is an elevational view of one of the melting and refining units particularly illustrating an arrangement of combustion burners for applying heat to the melting and refining unit and a recuperator construction for supplying preheated air to the combustion burners.

An air blower 40 is provided for each jacket and is of the centrifugal type, the impeller of the blower being driven by a motor 128 shown in FIGURES 2, 3 and 4. The outlet of the blower is connected by means of a pipe 130 with a supplemental jacket 132 forming an extension of the main jacket 124. The upper end of the recuperator jacket 124 is provided with a plenum chamber 134. The plenum chamber 134 is connected by means of pipes 136 and 137 with a pair of manifolds 138 and 140 as shown in FIGURES 3 and 4.

A plurality of air pipe conveying tubes 144 is arranged at each side of each of the melting and refining units 18. One group of tubes 144 at one side of the melting and refining unit is arranged to supply air for combustion to the adjacent burners 108, and the group of tubes 144 at the opposite side of the melting and refining chamber 46 is arranged to supply air to the burners 108 at the opposite side of the unit. Each of the air conveying tubes 144 is provided with individual valve means 146 for regulating the delivery of air to each of the burners.

The blower 40 for each unit 18 forces air under pressure through the tube 130 into the supplemental jacket 132 and through the main recuperator jacket 124 whereby the air moving through the chamber provided by the jacket 124 is heated to a temperature of approximately 1300 degrees. The heated air at such temperature is conveyed through the tubes 136, 137 and the manifolds 138 and 140 to each of the burners 108 providing preheated air for supporting combustion of the fuel gas delivered to the burners by the gas conveying tubes 120.

Through this method, the air mixing with the fuel gas in the burners 108 is heated to a comparatively high temperature with a minimum of cooling effect at the burners. This factor contributes to the reduction in heat losses and facilitates maintenance of controlled temperatures in various regions of the melting and refining unit.

Means is provided for aspirating air into the stack 48 at a region above the jacket 124 to reduce the temperature of the gases from the melting furnace exhausting into the atmosphere and to establish a fluid damper effective to assist in maintaining the chamber 46 of the furnace under pressure slightly above atmospheric pressure. A blower 42 is provided for supplying air to each stack, the blower being driven by motor 43.

The outlet of the blower 42 is connected by means of a pipe or tube 152 with a nozzle 154 which delivers air from the blower into an entrance member or aspirator 156 in the stack 48 for admixing with the exhaust gases at a region above the plenum chamber 134 of jacket 124. Through this arrangement, air is provided to dilute the exhaust gases, reducing their temperature and controlling the pressure in the melting and refining chamber 46. Air flow to the aspirator is controlled by an automatic pressure regulator 157 actuating an air valve in the pipe 152.

Arranged at opposite sides of the furnace 18 adjacent the stack end of the furnace are batch charging stations including batch feed openings 99 provided with batch chargers or batch feeders 100 shown in FIGURES 1 and 2. Disposed above each of the batch chargers 100 is a hopper 101, each hopper being provided with a control valve 102 for regulating the delivery of raw batch into each charger 100. Each of the valves 102 is adapted to be controlled automatically through the medium of sensing means (not shown) influenced by the amount of glass or other mineral material contained in the melting and refining furnace chamber 46.

Conveyor means 19 of the screw type are disposed so as to convey raw batch to the several hoppers 101 for the several melting and refining units oriented in the manner shown in FIGURE 1. The tubular conduits 103 of the batch conveyors enclosing the batch feed screw means are in communication by means of tubes 104 with the individual or supplemental hoppers 101 for the respective batch chargers adjacent the melting and refining furnace and convey raw batch from a main hopper or supply 105.

The floor 86 of the furnace comprises an outer layer 90 of refractory such as clay flux, and an inner layer 91 formed of blocks or sections of zircon or similar high temperature resistant refractory which is resistant to erosion. The side and end walls 76 and 78 of the glass melting and conditioning furnace are of novel construction. The side and end walls are of laminated character and are fashioned of refractory of a character to substantially eliminate or greatly reduce erosion and thereby minimize contamination of the glass.

In the formation of glass into filaments or fibers, a highly refined glass is essential for satisfactory and efficient attenuation to fine continuous filaments or fibers. As shown in FIGURES 6 and 7, the side and end walls are made up of three layers or laminae 79, 80 and 81. The inner layer or lining 79 of both side and end walls is fashioned of blocks of refractory which is highly resistant to corrosion and erosion and preferably more highly resistant to erosion than the refractory of the intermediate layer. The innermost layer 79 is fabricated of a refractory such as chromic oxide, a material which is highly resistant to erosion in contact with molten glass.

The inner layer comprises a plurality of rectangularly shaped blocks or plates of chromic oxide arranged in adjacent relation with a slight space between the adjacent edges of the blocks to provide for expansion under high temperatures. The blocks are installed without a cementitious material as the body of molten glass retains the blocks in assembled relation.

The intermediate layer 80 comprises a plurality of substantial rectangular comparatively thin blocks or plates which are laid in a pattern so that the junctures or joints between adjacent plates of the intermediate layer 80 are staggered or out of registration with the junctures or joints between adjacent plates or blocks of the inner layer 79. The blocks or plates of the intermediate layer 80 are fabricated of a suitable refractory such as zircon which is highly resistant to deterioration or erosion in contact with molten glass but is not as highly erosion resistant as chromic oxide.

The outer layer 81 is fashioned of a heat resistant refractory such as clay flux, a material which has high insulating characteristics to minimize heat losses through the floor, said end walls of the furnace 84 and provides support for the intermediate and inner layers 80 and 79.

The zircon blocks forming the intermediate layer are laid up or assembled with small spaces between the side edges of adjacent blocks so as to permit expansion of the blocks without buckling under the intense heat of the molten glass. The blocks of both layers are unrestricted in a vertical direction to accommodate vertical expansion.

The inner and intermediate layers of refractory blocks, assembled without cement which would contaminate the glass, forms a construction wherein the glass provides the sealing means for the walls.

The molten glass may flow through the spaces between adjacent blocks of the chromic oxide thence laterally between the layer of chromic oxide blocks and the intermediate layer of zircon blocks, the temperature between the layers being somewhat less than the surface area of the chromic oxide blocks in contact with the molten glass.

The temperature differentials between the layers 79 and 80 is usually sufficient to cause some of the molten glass flowing between the layers to congeal or freeze and form a seal. If, under certain operating conditions, the glass is still in flowable condition at the region between the adjacent layers 79 and 80, the glass may flow into the space between adjacent zircon blocks of the intermediate layer 80 at which the temperature is reduced from the melting and refining chamber sufficiently to cause congealing of glass, in such regions.

Through this method completely sealed furnace side and end wall constructions are provided without the use of any cementitious material and the body of molten glass moving in and through the furnace is only brought in contact with the chromic oxide layer which, being highly resistant to corrosion and erosion under intense heat, minimizes or substantially eliminates contamination of the glass by the refractory contacted by the molten glass.

The arrangement of the furnace components controlled heating of the glass and control of the flow paths of the glass are such as to promote retention of the molten glass in the furnace for a substantial period of time and for circulatory traverse through substantial distances within the furnace chamber 46 before the molten glass leaves the furnace whereby to effect a fining and refining of the glass to a homogeneous state suitable for flowing fine streams of the glass for attenuation to fine textile filaments of uniform size and character.

The novel method of reducing the glass batch to a molten condition and traversing the molten glass in the furnace to effect fining and refining thereof is enhanced through the maintenance of controlled differential temperatures in the regions of the furnace above the glass and by agitating or accelerating movement of the molten glass in spaced regions to effect traverse of the glass in circuitous and substantially repetitive flow paths for a substantial period of time.

In establishing differential temperatures in the regions above the body of molten glass as a step in the method of fining and refining the glass, the burners 108 are adjusted or regulated so that the region indicated by the broken line A—A in FIGURE 6 about two thirds of the length of the chamber from the stack end of the furnace is maintained at a temperature approximately 100° F. higher than the end region of the furnace into which the batch is delivered by the batch chargers 100 through the feed openings 99 and approximately 50° F. higher than the end of the furnace at which the glass is delivered into the forehearth construction.

Through this differential temperature pattern, a hot spot or hot zone is established above the glass at the general region indicated by the line 184 in FIGURE 6, it being understood that the temperatures may be varied dependent upon the glass composition although the temperatures in all zones are well above the melting or fusing temperature of the glass. The burners 108 may be individually adjusted for the above-mentioned purposes and one type of regulation resides in lengthwise adjustment of the fuel delivery tube 120 of each of the burners 108 provided by the flexible hose 119.

Regulation or adjustment of the tubes 120 of the burners is determinative in a measure of the degree of luminosity of combustion and the efficiency of solid particle radiation and the temperatures of the burning mixture and of the gases of combustion. Furthermore, adjustment of the tube 120 varies the region of combustion in the chambers 111. Combustion is usually initiated in the chambers 111 of the burner blocks 109 and adjusting the fuel conveying tubes 120 modifies the region in the burner chamber where combustion takes place.

Adjustability of the region of burning or combustion of the fuel and air mixture promotes the achievement of maximum solid particle radiation and combustion efficiency to thereby obtain extremely high thermal efficiency. The pressures of the air and gaseous fuel delivered to the burners may vary slightly and effect a change in the region of combustion. The provision of an adjustable fuel supply tube at each burner provides means for compensating for variations in pressures of the air and fuel gas.

The invention embraces a novel method of effecting flow of the molten glass within the furnace chamber 46 in repetitive circuitous paths and agitating or accelerating movement of the glass at spaced regions in the chamber to foster glass flow by convection and temperature differentials within the body of glass to promote constant flow of the glass through distances within the chamber many times the length of the furnace before the fined and refined glass is flowed to the forehearth construction.

With particular reference to FIGURES 5 and 6, the floor 86 of the furnace is provided with at least two rows of bubblers, or agitators, the bubblers of the rows designated respectively 172 and 174 and being spaced transversely as shown in FIGURE 5. The floor of the furnace is provided with passages to receive tubular means 178 for conveying steam under pressure or compressed air to the bubbler orifices 172 and 174. A fluid such as steam or compressed air is continuously delivered through the bubblers into the molten glass or molten mineral material under controlled pressure at a constant flow rate.

The steam or compressed air delivered by the bubblers may be controlled by conventional valve means (not shown) connected with the tubes 178. In the embodiment illustrated, the bubblers 172 of one row are positioned at a distance of about one-third the length of the chamber from the stack end of the furnace. The bubblers 174 of the second row are positioned adjacent the exit end of the chamber 46 at a distance from the exit end wall of approximately one-eighth of the length of the furnace chamber.

The functioning of the furnace shown in FIGURES 5 and 6 in melting, fining and refining the glass is as follows: The glass batch is fed into the chamber 46 through the openings 99 in opposite side walls by the batch chargers or feeders 100 adjacent the stack end of the furnace. The motor driven batch chargers 100 are controlled by conventional means (not shown) such as probe level control means to maintain substantially constant the amount of glass in the furnace chamber 46.

The raw batch is gradually reduced to a molten or flowable state under the influence of heat in the furnace provided by the combustion of fuel and air mixtures in the burners 108. It should be noted that the batch is introduced at two oppositely disposed zones at the stack end of the furnace. Through this arrangement the intensely hot gases of combustion above the body of molten glass flow toward the stack and the heat of the gases reduces the batch material to molten condition.

As shown by the arrows 180 in FIGURE 6, the glass, as it is progressively melted, tends to move in circuitous paths between the first row of bubblers 172 and the stack end of the furnace. The steam or air delivered from the bubblers 172 agitates or accelerates flow of the glass in circuitous paths adjacent the stack end, which movement of the glass promotes more rapid melting of the batch as well as assisting in rendering the freshly molten glass homogeneous.

The broken line 184 in FIGURE 6 indicates the center or axis of the zone of highest temperature in the furnace as previously described and which is attained by regulation of the burner tubes 120 to provide the high temperature at this region. The transverse axis of the high temperature zone being approximately two-thirds of the length of the furnace from the stack end provides a "hot spot" or thermal dam which effects the traverse of the glass during the fining and refining stages in the process.

The establishment of temperature differentials in the body of molten glass sets up paths of flow of the glass by convection. In the body of glass in the furnace chamber 46, the upper region or layer of the body flows away from the high temperature zone 184 toward zones of lower temperature. The glass of the upper region of the body at the left side of the hot zone, as viewed in FIGURE 6, flows toward the stack end as indicated by the arrows 186, and the upper region of glass at the right side of the hot zone 184 flows away from the hot zone in a right-hand direction as indicated by the arrows 188.

As the glass of the upper layer moves toward the stack end, the glass is caused to be deflected by the action or agitation by the steam or air projected into the glass from the bubblers 172 and to flow downwardly and in a reverse direction toward the hot zone 184 along the floor of the chamber 46 as indicated by the arrows 190.

During this circuitous movement of the glass between the row of bubblers 172 and the hot zone 184, fining and refining of the glass takes place so that the glass is progressively rendered more homogeneous and of improved quality, occluded gases being driven from the glass being discharged through the stack conveying away the combustion gases.

The molten glass at the right side of the hot zone or thermal dam 184, as viewed in FIGURE 6, flows by agitation and convection in a similar circuitous path, the upper layer moving away from the hot zone as indicated by the arrows 188 toward the second row of bubblers 174. The turbulent action of the bubblers 174 in the glass causes the adjacent glass to move downwardly and to flow in a reverse or left-hand direction along the floor of the furnace as indicated by the arrows 192 toward the hot zone 184.

The glass between the bubblers 174 second row and the skimmer block 194 flows in a circuitous path in the direction of the arrows 196 under the influence of the bubblers 174 and the flow of refined glass out of the chamber 46 beneath the skimmer block into the forehearth as indicated by the arrows 198. Thus the melting of the glass occurs substantially completely in the zone between the row of bubblers 172 and the stack end of the furnace.

As glass is continuously flowing from the chamber 46 into the forehearth construction, there is a lowering of level of the glass at the exit end of the furnace which fosters an over-all or progressive movement of the glass in the chamber 46 toward the outlet at the forehearth modified by the circuitous travel of the glass during the fining and refining stages. Thus the incoming glass batch is reduced to molten condition and the molten glass builds up to a depth or level at the stack end so that during the circuitous travel, some of the glass, by reason of the progressively decreasing depth to the exit end of the chamber, flows over the region of the bubblers 172 and into the portion of the glass moving in a circuitous route indicated by arrows 186 and 190.

The glass at this region continues in its circuitous path between the bubblers 172 and the hot zone 184. As the depth of the glass diminishes at the exit end, some of the glass moving the paths indicated by the arrows 186 and 190, continuously moves across the thermal dam or hot zone 184 and becomes a portion of the glass moving in the circuitous paths indicated by the arrows 188 and 192.

Some of the glass from this region between the hot zone and the bubblers 174 continuously moves through the zone of the bubblers to join the glass moving moving in the direction of the arrows 196 thence through the outlet passage 199 beneath the skimmer block 194.

From the foregoing description of the method of melting, fining and refining the glass in the furnace it will be apparent that the glass, in the several zones defined by the hot zone and the bubblers, travels or flows in paths many times the over-all length of the furnace before moving through the outlet to the forehearth. During the progressive cyclical flow or travel of various zones of the glass wherein the glass of each zone near the furnace floor moves in one direction and the portion of the glass near the surface of the body moves in opposite directions, the molten glass is progressively and continuously fined and refined so that the conditioned glass leaving the furnace is of homogeneous character, substantially free of impurities and gases, and is suitable for providing fine streams from which textile filaments are formed.

While the circuitous paths in the various zones of the glass illustrated in FIGURE 6 have been shown and described as moving lengthwise of the furnace, it is to be understood that similar flow paths of the glass are existent in angular and transverse directions with respect to the central region of the furnace due to convection resulting from temperature gradients from the hot central zone in the furnace to the zones of lower temperature near the side walls of the furnace.

As the heat from the burners in each side wall of the furnace moves toward the longitudinal central zone of the furnace throughout substantially the entire length thereof, there is a central region of increased temperature lengthwise of the furnace which fosters convection movements of the glass transversely and angularly as the hottest glass at the surface region moves toward the furnace side walls from the central zone and the glass near the floor of the furnace moves generally in the opposite direction toward the hot zone.

The combined distance traveled by the glass in its movement from the melting region at the stack end to the outlet of the furnace and the length of time that the glass remains in the furnace for fining and refining action is dependent upon several factors which may be controlled such as regulation of the depth of glass, adjustment of the burners 108 and pressure of gas at the bubblers. The deeper the body of glass in the furnace, the greater the temperature differentials within the body of the glass. Consequently the strength of the convection currents is accelerated thereby increasing the rate of flow of the glass in the furnace in the several circuitous paths hereinbefore described.

It is therefore advantageous to maintain a substantial depth of glass to secure strong convection currents as such movements of the glass provide a more stable condition which may be referred to as time-temperature stabilization.

With accelerated movement or flow of the glass within the furnace, the glass is less critical to minor temperature variations in isolated regions of the melt or body of glass so that a more homogeneous melt is assured.

Strong convection flow tends to offset minor temperature variations which may tend to be set up in corners or isolated regions of the furnace so that the tendency for chilled isolated regions to be formed is substantially eliminated. It is advantageous to keep the temperature of the glass sufficiently high so that the viscosity of the glass is comparatively low as this condition enhances higher convection flow rates in the glass. An increase in viscosity resulting from a reduced temperature tends to slow up convection flow and to reduce the efficiency of fining and refining of the glass.

It will be apparent from FIGURES 5 and 6 that the melting and refining furnace is of substantially greater length than its width and preferably in a ratio of about four to one as this facilitates improved fining and refining of the melt. It is highly essential to attain a balanced heat pattern for flow stability throughout the movement of the glass through the furnace. It is found that a tank which is comparatively long and narrow provides for improved control of stability of the time-temperature pattern. Through proper control the glass is forced to remain an increased length of time in the furnace and to traverse greater distances and thereby secure a homogeneous and highly refined glass.

The reduction of the batch to a molten condition by charging the furnace with batch for opposite sides at the stack end improves the heat balance of the melting zone because the batch is progressively heated as it is delivered transversely toward the center line of the furnace from opposite sides and hence there is less variation in temperature or thermal shock to the melt.

This method of processing the batch and fining and refining the melt provides a time-temperature balance in the furnace which eliminates surging temperatures which would affect the condition of the melt. The method provides dynamic constancy of all factors affecting the melt to prevent or eliminate variations in the operating conditions under which the glass is processed.

The rows of bubblers and their relative positions are important factors in the process as they agitate the melt and thereby promote the continuous effectiveness of the hot zone in the glass between the rows of bubblers to stabilize and maintain a proper heat balance in the melt. Through the established temperature differentials and resulting convection currents, the glass of the upper region of the melt between the rows of bubblers is caused to flow in opposite directions from the hot spot or hot zone 184, a factor which assists in off-setting minor variations in temperature that may occur in isolated regions of the furnace.

It is also important to maintain the melt at a comparatively high temperature in order to effectively drive off occluded gases in the melt.

The roof or cover structure 96 of the furnace is fashioned with openings or passages which accommodate thermocouple elements 202 connected with suitable indicating means of conventional character (not shown) for indicating temperatures in the several zones of the furnace above the molten glass. The side walls of the furnace, as shown in FIGURE 5, are provided with sight openings 203 to facilitate visual inspection. The floor 86 of the furnace is equipped with thermocouples 204 for indicating temperatures of the glass adjacent the furnace floor.

The forehearth and stream feeder structures associated with each of the melting furnace units 18 are illustrated in FIGURES 5 and 8 through 14. With particular reference to FIGURES 5 and 8 through 10, the forehearth construction is inclusive of a main or connecting neck section 60 and a continuation or bridge section 61 for supplying the refined glass from the furnace to the supplemental forehearth sections or branches 56, 57, 58 and 59 of each unit, the assembly of such components of one unit being illustrated in FIGURES 1 and 5.

The forehearth connecting section 60 and the continuation section 61 are of rectangular shape and are fashioned to form a glass conveying channel 210 in the connecting section 60 which is in communication with a glass conveying or feed channel 212 in the forehearth continuation or bridge section 61, the glass conveying channel 212 being of lesser width than the channel 210.

At the region of juncture of the connecting section 60 with the furnace, the skimmer block 194 is spaced above the furnace floor 86 to provide a restricted passage or channel 199 through which the refined glass flows from the furnace.

The floor 216 of the forehearth defining the bottom of the glass conveying channels 210 and 212 is elevated above the furnace floor 86 as shown in FIGURE 8 so that a minimum amount of flowing glass is maintained in the glass feed channels 210 and 212 sufficient to supply the requirements of the feeder bushings or feeders 68 associated with the forehearth sections 56 through 59. The connecting section 60 at its entrance region is defined by a built-up refractory block floor section 218 having an angular floor surface 219 connecting the furnace floor with the floor 216 in the forehearth connecting and continuation sections.

The floor of the connecting section 60 is provided with a block 220 fashioned with a drain opening 221 for draining off dross or impurities from the glass. The floor beneath the skimmer block 194 is provided with a thermocouple 205 for indicating the temperature of the glass in the channel 199. The floor 216 of the connecting section 60 and continuation section 61 is constructed in a manner similar to the construction of the furnace floor hereinbefore described. The side walls 224 of the connecting and continuation sections 60 and 61 are constructed in substantially the same manner as the side and end walls of the furnace as hereinbefore described.

The roof or super structure 238 of the connecting section 60 in inclusive of side walls 240 fashioned of layers of high temperature resistant refractory. Mounted upon the upper blocks of the walls 240 are two groups of blocks 244 and 245 which are spaced as shown in FIGURE 9 to provide a gap or space 246 extending lengthwise of the connecting forehearth section 60. Superposed upon the blocks of the layers 244 and 245 is a top layer formed of two rows of blocks 248 and 249.

The blocks of the layers 248 and 249 are not secured to the supporting layers 244 and may be manually moved or adjusted transversely to provide a vent passage between adjacent blocks of the upper layer. As each layer 248 and 249 is made up of a plurality of blocks, individual pairs of the blocks may be adjusted to regulate or vary the temperature gradient in the connecting flow channel 210. As hereinafter explained, it is desirable that the temperature of the glass be reduced during its flow from the region of the skimmer block 194 to the entrances of the glass flow channels of the supplemental forehearth sections 56 through 59.

Each of the forehearth branches or sections 56, 57, 58 and 59 is provided with a glass flow channel 250. The glass flow channel 250 of forehearth section 57 is shown in FIGURES 5, 7 and 8 and the glass flow channel of the forehearth section 59 is illustrated in FIGURE 8, the latter being connected with the glass channel 212 adjacent the outer end of the latter.

Means is provided in the roof structure of the forehearth section 61 for continuously supplying heat to the glass or molten mineral material in the flow channel 212 to stabilize and maintain the glass at the desired temperature. As shown in FIGURES 8 and 10, the roof structure 256 for the flow channel 212 is fashioned of a plurality of blocks of high temperature resistant refractory. The blocks 258 providing the center zone of the roof section are fashioned with chambers 260 accommodating burners 262.

The burners 262 are preferably of the radiant heating type and are adapted to burn a combustible mixture of fuel gas and air to direct heat onto the molten glass in the channel 212. The burners 262 are connected with a mixture supply manifold (not shown) and individual valves 263 provided for each of the burners 262 to regulate each burner independently of the others and thereby provide a method and means for accurately establishing the proper temperature for the glass throughout the length of the glass flow channel 212 in the connecting or bridge section 61 of the forehearth construction.

The end wall 264 of the continuation 61 of the forehearth may be provided with a sight opening 265 to facilitate visual inspection of the interior of the channel 212. The roof region of the connection section 60 is fashioned with passages accommodating thermocouples 266, 267 and 268, and the roof structure above the flow channel 212 may be fashioned with passages accommodating thermocouples 270, 271 and 272 as shown in FIGURE 8. The thermocouples are connected to suitable indicators for indicating the temperatures in the various zones.

The forehearth branches or sections 56, 57, 58 and 59 of each unit are of substantially identical construction. FIGURE 11 is a longitudinal sectional view of the forehearth section or branch 57 and, as the branch sections are substantially identical, a description of one section will suffice for all. Each forehearth branch is supported by structural steel construction 276. Each forehearth branch section is fashioned with a floor structure 278 of refractory, the inner layer 280 being preferably fashioned of refractory such as zircon which is highly resistant to corrosion and erosion.

The lower layer 281 may be fashioned of blocks of zircon or other suitable refractory. Each forehearth branch section is formed with a longitudinal extending glass flow channel 282, the side walls 284 of which are preferably lined with erosion resistant refractory. The side walls are supported by suitable blocks of refractory assembled as shown in FIGURE 12. The channel 282 is provided with a roof structure comprising multi-layers of blocks 288 and 289 of refractory.

The blocks 288 and 289 are provided with chambers 290 accommodating radiant burners 292 as shown in FIGURES 11 and 12 for directing heat onto the glass in the channel 282. Certain blocks of refractory in the roof structure are provided with passages accommodating thermocouples 296 for indicating temperatures in various zones lengthwise of the section.

The floor structure 278 of each forehearth branch section is formed with lengthwise spaced rectangularly shaped openings 300 and a feeder 68 of elongated rectangular shape fashioned of high temperature resistant metal or alloy, such as an alloy of platinum or rhodium, is arranged beneath and in registration with each of the passages 300 whereby the glass in the glass channel 282 flows into each of the feeders or bushings 68. Each bushing 68 is provided with multiple rows of tips or projections 304 having orifices or passages through which fine streams of glass are delivered which are attenuated to filaments as hereinafter described. One of the feeders 68 is illustrated in FIGURES 11 and 12.

The glass channels 250 of the forehearth branches 56 and 57 are in communication with the glass flow channel 210 at the region where the channel 210 is narrowed in width to the channel 212. The molten glass in the channels 210 and 212 is maintained by heat from the burners 262 at a temperature conditioning the glass at a viscosity to enhance its flow into the forehearth sections 56 through 59. The viscosity of the glass in the channels 210 and 212 is lower than the viscosity at which the streams of glass may be efficiently attenuated to fine filaments.

In order to reduce the temperature of the glass and thereby increase its viscosity as it moves into each of the glass channels 250 of the forehearth branch sections, a heat sink is arranged to transfer or convey heat away from the glass at its region of entrance into each of the flow channels 250 to condition the glass for satisfactory attenuation to filaments.

As particularly shown in FIGURES 11, 13 and 14, the heat sink 308 for each channel 250, in the embodiment illustrated, comprises an elongated core section 310 of rectangular shape preferably encased or enclosed in a metal or metal alloy covering 312 providing a media for absorbing and conveying heat from the molten glass at the entrance of each of the glass channels 250 in the forehearth branches or sections. The metallic component of the heat sink bar 308 may be fashioned of an alloy of platinum and rhodium or other metallic material which will withstand the comparatively high temperature of the molten glass without appreciable deterioration.

As shown in FIGURES 11 and 14, the lower central portion of each heat sink 308 is formed with a recess 314 of a width substantially equal to the width of the flow channel 250 providing a comparatively shallow channel or passage to accommodate the flow of molten glass into a channel 250. The passage provided by the recess 314 is of a minimum height to present substantial area of the metal covering 312 to the glass to effect the transfer and conveyance of a substantial amount of heat away from the glass during its period of contact with the metal transfer component 312.

The level of the glass in the feed channels 210 and 212 in the connecting sections 60 and 61 and the level of the glass in each of the flow channels 250 of the forehearth branches or sections is substantially above the surface 316 defining the ceiling of the recess or passage 314 so that a substantial area of the side walls of the metal covering 312 of the heat sink is in contact with the molten glass.

The cross sectional area of the recess or passage 314 is such as to accommodate the flow rate of glass sufficient to satisfy the requirements of the stream feeders or bushings 68.

As shown in FIGURE 13, the regions of the side walls of each of the forehearth branches are fashioned with recesses or open zones 318 to facilitate and promote the radiation or dissipation of heat from the heat sink 308 to the ambient air or atmosphere. The preferred temperature gradient of the glass from the region at the exit channel 199 of the melting and refining chamber 46 into the glass flow channels of the forehearth branches or sections is accurately controlled to assure uniform viscosity and flow of glass in the channels 250 so that the characteristics of the glass in each of the feeders or bushings 68 are identical.

The following temperatures are exemplary of temperature gradients that my be established and maintained, but it is to be understood that the temperatures and temperature gradients may vary dependent upon the composition of the glass, the pull rates of the glass from the feeders 68 and other operating factors. For example, the temperature of the refined molten glass at the exit end of the furnace adjacent the skimmer block 194 and channel 199 may be 2600° F. In the embodiment illustrated, no heat is applied to the flow channel 210 in the connecting portion 60 of the forehearth.

The connecting section 61 provides a region in which heat is radiated away from the molten glass to effect a reduction in temperature of the glass in the channel 210 to about 2350° F. The ceiling blocks 249, shown in FIGURES 8 and 9 may be adjusted to vary the venting of the channel 210 to control the temperature drop. The burners 262 in the roof or ceiling of the forehearth connecting section 61 are regulated to maintain the temperature of the glass in the flow channel 212 so that at the end region of the glass channel 212, the temperature of the glass is at approximately 2350° F.

As the glass flows around and beneath the heat sinks 308 the temperature of the glass in the flow channels 250 of the forehearth branches or sections is reduced to approximately 2150° F. and the burners 292 in the roofs or ceiling regions are regulated by manipulation of valves 293 to maintain the glass at a uniform temperature throughout the lengths of the channels 250. The temperature gradient in the region of the connecting section 60 along the flow channel 210 is indicated by pyrometers (not shown) connected with the thermocouples 266, 267 and 268.

The temperature in the flow channel 212 is regulated by control of the radiant burners 262 and indications of the temperatures provided by pyrometers connected with the thermocouples 270, 271 and 272.

The temperature of the glass throughout the length of each of the forehearth branches or sections 56 through 59 of each unit 18 is regulated and maintained at the desired value by controlling the radiant heaters or burners 292 in the roof portion of each of the sections and the temperatures indicated at spaced regions lengthwise of each forehearth branch or section by the thermocouples 296 connected with conventional pyrometers.

The heat sink 308 at the entrance of the glass flow channel in each forehearth branch section further reduces the temperature below that of the glass in the flow channels 210 and 212 to bring the glass to the most efficient attenuating temperature. It is to be understood that the operating temperatures for the molten glass vary in accordance with the particular glass composition and hence temperature gradient values herein given are exemplary only of the conditions necessary or desirable for effecting proper viscosity and flow rates of the glass in the several flow channels of each unit.

FIGURE 5 is illustrative of one glass melting and refining furnace and multiple section forehearth or glass distributing facility providing one complete unit 18. In the system and method of the invention multiple units 18 of the character shown in FIGURE 5 are arranged in the manner shown in FIGURE 1, two units being illustrated in FIGURE 1, although any number of units may be employed in the pattern of orientation shown in FIGURE 1.

It should be noted that the pairs of forehearth sections of branches extending from each connecting section 60 and bridge or continuation section 61 are arranged in aligned parallel relation with the forehearth branches of an adjacent unit. Thus, as shown in FIGURE 1, the forehearth branch 57 of one unit 18 is in adjacent aligned relation with the forehearth branch 56 of the adjacent melting and distributing unit 18, and the forehearth branch 59 is in aligned relation with the forehearth branch 58 of the adjacent unit.

Through such positioning, the forehearth branch sections or branches of each unit 18 with the bridge connection 61 from an H-shaped or double T-shaped forehearth construction, the aligned forehearth branches providing for two spaced parallel rectilinear rows of feeder bushings 68 as indicated in FIGURE 1. With particular reference to FIGURES 15, 16 and 17, it will be apparent that each of the feeders 68 provides groups of fine streams 70 and 71 which are attenuated into fine continuous filaments forming strands 72 and 73 respectively, the filaments being attenuated through automatic winding machines effective to wind the strands 72 and 73 into packages, the winding effecting attenuation of the groups of streams.

The H-shaped configuration or orientation of the forehearths with the forehearth branches or sections arranged in two parallel rows make it possible to feed the groups of streams from the several forehearth sections of several units into generally parallel regions or rows and facilitating the placement of two rows of automatic winding machines, there being a winding machine beneath each of the feeders in the forehearth sections.

Through a compact arrangement of this character, the two rows of winding machines may be advantageously positioned along the side walls 33 and 34 defining a longitudinally extending room or chamber 36 in which the winding machines are located, the side walls also providing a forming room or chamber 64 above the winding machine chamber. The bridge portion 61 of each of the forehearth arrangements extends transversely across the forming room 64 as shown in FIGURE 17 which enables the positioning of the forehearth branches or sections arranged in parallelism with the side walls 33 and 34.

As will be noted in FIGURE 17, there are two rows 28 and 30 of automatic winding machines 328 there being one winding machine beneath each of the streams feeders or bushings 68. Each of the automatic winding machines is of a type embodying an indexible head 332 equipped with a plurality of collets 334, each collet being adapted to slidably receive a pair of thin walled sleeves 336 which form collectors upon which the stands are wound to form strand packages.

The strands 72 and 73 are wound upon a respective pair of sleeves 336 at each winding station, each collet in winding position at a winding station being rotated by means (not shown) to wind the strands upon the rotating collectors. Traverse means 340 forms a component of each winding machine for traversing the strand lengthwise of the collectors 336 in order to distribute the strand on the collectors.

The winding machines 328 are preferably of a type having three collects 334, which are indexible by rotation of the head 332 into three positions viz. a winding position indicated at "B" as shown in FIGURE 16 at which the package forming takes place; a station indicated at "C" at which the completed strand packages are removed from the collet and empty sleeves placed thereon; and a station "D" at which the collet bearing the empty sleeves is disposed in "stand-by" position which is adapted to be rotated approximately to winding speed preparatory to a shift of the indexible head 332 to move the completed strand packages away from position "B" and the standby sleeves from position "D" into winding position.

The flood 65 of the room or chamber 64 is provided with two rows of openings 341 to accommodate traverse of the groups of strands 72, 73 to the winding machines 328. Disposed adjacent and in generally parallel relation with the strands from each feeder is a baffle 334 to reduce air turbulence in the region of the rapidly moving strands, the filaments of the strands being attenuated at speeds of from 12,000 to 20,000 or more feet per minute.

Disposed beneath the winding machines 328 are waste chutes 348, the openings of the chutes registering with passages 350 in the flood 32 to convey the waste strand into hoppers 352. Each of the hoppers 352 is provided wtih a clean out door 354.

FIGURES 15 and 16 illustrate the spaced parallel forehearth branch sections and the rows of feeders adjacent the side walls 33 and 34 of the chamber 64. The lengths of the chambers or rooms 36 and 64 are dependent upon the number of forehearth sections and melting units arranged in the relation illustrated in FIGURE 1, the rooms 36 and 64 being coextensive. As shown in FIGURE 15, the side walls 33 and 34 are provided with brackets 358 supporting receptacles 360 containing a binder or other filament coating material, applicators 362 being associated with each receptacle 360 engaging the groups of filaments to apply a coating, binder or adhesive to the filaments.

Disposed beneath each receptacle 360 and preferably supported thereby are filament gathering means 364, there being one for each of the strands for gathering the groups of filaments into strands 72 and 73. Extending transversely of the chamber or room 36 adjacent the ceiling 65 are beams 370 supporting a pair of I-beams 372 arranged in parallelism as shown in FIGURES 15 and 17 and which provide ways or track means supporting carriages 376 as shown in FIGURE 15. The carriages 376 are equipped with rollers 377 which transverse the flange portions of the I-beams 372.

Each of the carriages 376 is formed with a plurality of arms 378 providing means for supporting the completed strand packages 338.

One operator is enabled to supervise the operation and maintenance of several winding machines and, as the strand packages are completed by the automatic winding machines, the operator removes the completed strand packages 338 and places them upon the arms of the carriages 376. When the arms of the carriage are filled with strand packages, the carriages may be moved along the tracks provided by the I-beams 372 to convey the strand packages from the room 36 for further processing.

Means are provided for establishing supplies of empty strand collector sleeves adjacent the winding machines. As shown in FIGURES 15, 16 and 17 a magazine 384 is provided adjacent each winding machine which is adapted to contain a supply of empty collector sleeves 336. The end of each magazine is provided with an angularly arranged abutment or stop 386 which retains the lowermost sleeve or collector in the magazine in a position to be readily withdrawn by the operator and placed upon a collet at position "C" of a winding machine.

Each of the feeders 68 shown in FIGURE 11 is provided with lugs 303 which form terminals for connection with an electric circuit for flowing electric energy through each feeder to accurately maintain the glass at a predetermined constant viscosity. As shown in FIGURE 15, a transformer 390 is provided for each feeder or group of stream feeders for supplying electric energy through the bussbar construction 392 connected with terminals 394 which engage and are clamped to the terminal lugs 303 of each of the feeders.

Each transformer 390 is connected with a source of alternating current supply, the transformers being for the purpose of delivering current of high amperage and low voltage to the feeders. It is desirable to deliver fine sprays of moisture onto the filaments below the attenuating region. As shown in FIGURE 15, rows of nozzles 396 are disposed adjacent the groups of filaments from the feeders and are connected with manifolds 398 supplied with water under pressure, the nozzles 396 projecting fine sprays of water or mist onto the filaments.

From FIGURES 1, 15, 16 and 17, it will be seen that the glass melting and furnace units 18 and their multiple branch forehearth constructions are oriented or arranged so that the forehearth branches are disposed in longitudinal parallel rows for delivering groups of filaments from the feeders into parallel rows within the long room or chamber 64. The filaments from the feeders are attenuated by the rows or batteries of automatic winding machines 328 which are disposed along the side walls of the elongated chamber, room or tunnel 36 which is coextensive with and beneath the chamber or room 64.

The operators are stationed in the room 36 and attend the automatic winding machines 328, performing the functions of removing the filled packages 338 of glass strand from the machines, depositing the packages on the arms 378 of the carriages 376, and placing empty sleeves or collectors 336 from the magazines 384 on the winding collets of the winding machines.

The operation of the winding machines is continuous as are other method steps of melting the raw glass batch, traversing or flowing the molten glass in controlled circuitous paths in the melting and refining chamber, conditioning the glass to maintain its continuous flow into the several forehearth branches of the H-shaped forehearth construction of each unit and thereby maintain continuous delivery of streams through the orificed feeders 68 for attenuation into filaments gathered into the strands 72, 73 and automatically packaged on the winding machines.

The track arrangements 372 extend throughout the length of the room or chamber 36 and support a plurality of the carriages 376 and as the carriages become filled with strand packages are conveyed by the tracks away from the winding room.

By the compact arrangement of the winding machines in rows or batteries along the walls of a single room or chamber 36 resembling a tunnel, a minimum number of operators are enabled to maintain continuous operation of the winding machines. The system and arrangement described enables the continuous high speed and high volume production of filamentary material, effecting substantial economies in the production and packaging of strand material formed of glass filaments of a fineness particularly suitable for fabrication of fine textile materials.

While FIGURE 1 is illustrative of a preferred arrangement of two melting, refining forehearth units, it is to be understood that more than two units may be arranged in the pattern or orientation illustrated in FIGURE 1. The chambers 36 and 64 are of a length dependent upon the number of units having their forehearth sections in aligned relation in the manner shown in FIGURE 1. The chamber or room 36 and 64 is adequate to accommodate several operators whereby each operator supervises a group of machines with a minimum of effort on the part of the operators and without operator interference.

It is apparent that, within the scope of the invention, modifications and different arrangements may be made other than as herein disclosed, and the present disclosure is illustrative merely, the invention comprehending all variations thereof.

We claim:

1. The method of processing heat-softenable material including feeding batch material into an elongated chamber adjacent one end of the chamber, applying heat to the chamber to melt the batch material in the chamber, regulating the heat to establish a zone of highest temperature in the chamber intermediate its ends, agitating the molten material at a region spaced from the zone of highest temperature to effect flow of the molten material in opposing directions substantially at the zone of highest temperature to refine the material, and continuously flowing a stream of the refined molten material through a passage at the other end of the chamber.

2. The method of processing heat-softenable material including feeding batch material into an elongated chamber adjacent one end of the chamber, heating the chamber to melt the batch material and establish a body of the molten material of substantial depth in the chamber, controlling the heat to establish and maintain a zone of highest temperature above the body of molten material in the chamber intermediate its ends, projecting streams of gas through the body of molten material at regions at opposite sides of the zone of highest temperature whereby to accelerate flow of the molten material by convection in a plurality of circulatory paths to refine the molten material by traversing the material through distances within the body of material substantially greater than the length of the chamber, and continuously flowing a stream of the refined material through a shallow passage at the other end of the chamber.

3. The method of melting and refining heat-softenable mineral material including feeding batch mineral material into an elongated receptacle at opposed transverse regions adjacent the rear end of the receptacle, heating the interior of the receptacle above the mineral material to melt the batch and establish a body of molten material of substantial depth in the receptacle, venting the gases from the receptacle, regulating the heat to establish and maintain a thermal dam of highest temperature at a zone at an intermediate region in the receptacle, injecting a gaseous medium through the floor of the receptacle into the body of molten material at transverse regions between the zone of the thermal dam and the ends of the receptacle to accelerate flow of the material to effect continuous recirculation of the molten material in circulatory paths to refine the molten material, and continuously flowing a stream of the refined material through a passage at the other end of the receptacle.

4. Apparatus for processing heat-softenable material including, in combination, a furnace formed with a melting and refining chamber, a stack construction adjacent one end of the furnace, a forehearth outlet section joined with the other end of the furnace formed with a flow passage for the molten material, means for feeding batch material into the chamber adjacent the stack end, a plurality of heating means associated with the side walls of the furnace for melting the batch material, means for controlling the heating means to establish a zone of highest temperature in the chamber at a region intermediate its ends, the floor of the chamber being provided with orifices arranged in rows transversely of the chamber wherein a row is disposed at each side of the zone of highest temperature, said orifices being arranged to deliver jets of gas into and upwardly through the body of molten material in the chamber to effect movement of the molten material in repetitive circulating paths between the rows of orifices and the zone of highest temperature and between the rows of orifices and the ends of the chamber to refine the molten material.

References Cited by the Examiner

UNITED STATES PATENTS

| | | | |
|---|---|---|---|
| 2,203,269 | 6/1940 | Mulholland | 65—326 X |
| 2,331,052 | 10/1943 | Sadduck | 65—134 |
| 2,975,224 | 3/1961 | Burch | 65—136 X |
| 3,030,736 | 4/1962 | Penberthy | 65—134 |
| 3,140,334 | 7/1964 | Penberthy. | |
| 3,142,551 | 7/1964 | Von Wranau | 65—1 |
| 3,198,618 | 8/1965 | Penberthy | 65—134 X |

FOREIGN PATENTS 689,297   3/1953   Great Britain.

DONALL H. SYLVESTER, *Primary Examiner.*

F. W. MIGA, *Assistant Examiner.*